US006968310B2

(12) United States Patent
Nemoto

(10) Patent No.: US 6,968,310 B2
(45) Date of Patent: Nov. 22, 2005

(54) METHOD, SYSTEM, AND APPARATUS FOR SPEECH RECOGNITION

(75) Inventor: Kazuo Nemoto, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 09/846,122

(22) Filed: Apr. 30, 2001

(65) Prior Publication Data

US 2001/0039492 A1 Nov. 8, 2001

(30) Foreign Application Priority Data

May 2, 2000 (JP) .............................. 2000-133973

(51) Int. Cl.[7] .............................................. G10L 15/00
(52) U.S. Cl. ....................... 704/231; 704/257; 704/251
(58) Field of Search ............................... 704/257, 251, 704/252, 254, 231, 239, 240, 250, 255

(56) References Cited

U.S. PATENT DOCUMENTS

| 4,696,042 A | * | 9/1987 | Goudie ....................... 704/254 |
| 5,133,012 A | * | 7/1992 | Nitta ........................... 704/251 |
| 5,829,000 A | * | 10/1998 | Huang et al. ................ 704/252 |
| 5,937,385 A | * | 8/1999 | Zadrozny et al. ........... 704/257 |
| 6,182,039 B1 | * | 1/2001 | Rigazio et al. ............. 704/257 |
| 6,208,966 B1 | * | 3/2001 | Bulfer ......................... 704/251 |

* cited by examiner

Primary Examiner—Susan McFadden
Assistant Examiner—Huyen X. Vo
(74) Attorney, Agent, or Firm—Akerman Senterfitt

(57) ABSTRACT

The present invention can be used to improve speech recognition accuracy, especially with regard to characters, words and the like which can correspond to a plurality of readings. The same person can be apt to maintain the same reading in the same conversation. For example, a person who pronounced "7" "shichi" is apt to pronounce "shichi" consistently in the conversation. By utilizing this tendency, recognition from the second time is executed after reducing a recognition probability corresponding to the reading, which is not used by the person in the first response of the conversation. In the case where a system repeats a recognition result by speech synthesis, the system repeats the recognition result corresponding to the reading of a speaker that is already recognized. For example, when the speaker pronounced "7" "shichi", the system pronounces "shichi" at the time of repetition.

36 Claims, 9 Drawing Sheets

FIG. 2

| | |
|---|---|
| 0 (REI) | r e e |
| 0 (REI) | r e e: |
| 0 (REI) | r e i |
| 0 (ZERO) | z e r o |
| 1 | i ch i |
| 2 | n i |
| 2 | n i i |
| 2 | n i i: |
| 3 | s a_n |
| 4 (SHI) | sh i |
| 4 (SHI) | sh i i |
| 4 (SHI) | sh i i: |
| 4 (YON) | y o_n |
| 5 | g o |
| 5 | g o o: |
| 5 | g o u |
| 6 | r o k u |
| 7 (SHICHI) | h i ch i |
| 7 (NANA) | n a n a |
| 7 (SHICHI) | sh i ch i |
| 8 | h a ch i |
| 9 (KU) | k u |
| 9 (KYUU) | ky u u |
| 9 (KYUU) | ky u u: |

FIG. 4

```
<digits>::=<num1><num1><num1>.
<num1>=
0|
1|
2|
3|
4|
5|
6|
7|
8|
9.

```
<digits>::=<num1><num1><num1> .
<num1>=
0 |
1 |
2 |
3 |
4 |
5 |
6 |
7 |
8 |
9 .

```
<digits>::=<num1><num1> .
<num1>=
0 |
1 |
2 |
3 |
4 |
5 |
6 |
7 |
8 |
9 .

<0> = | zero | zero | zero | <rei> .
<1> = | i ch i .
<2> = | n i | n i i | n i: .
<3> = | s a_n .
<4> = | sh i | sh i i | sh i: | y o_n .
<5> = | g o | g o o: | g o u .
<6> = | r o k u .
<7> = | h i ch i | n a n a | sh i ch i .
<8> = | h a ch i .
<9> = | k u | ky u u | ky u u: .

<rei> = | r e e | r e e: | r e i .
```

METHOD, SYSTEM, AND APPARATUS FOR SPEECH RECOGNITION

CROSS REFERENCE TO RELATED APPLICATIONS

This application claims the benefit of Japanese Application No. 2000-133973, filed May 2, 2000.

STATEMENT REGARDING FEDERALLY SPONSORED RESEARCH OR DEVELOPMENT (Not Applicable)

BACKGROUND OF THE INVENTION

1. Technical Field

The present invention relates to the field of speech recognition, and in particular, to reducing the available speech elements within a speech grammar during a dialog.

2. Description of the Related Art

In speech recognition systems such as ViaVoice®, speech recognition can be performed by receiving a user spoken utterance through an input device such as a microphone or a headset. The received user spoken utterance can be analyzed and converted into speech elements. The analyzed speech elements and speech elements accumulated in a database can be compared. Thus characters and words that correspond to the entered speech elements can be extracted. Notably, the speech elements accumulated in the database need not be individually or independently stored, but rather can be stored relating to a grammar which follows particular kinds of rules. For example, in the case of recognizing a four-digit number as shown in FIG. 9(a), four digits of <num1> are defined as <digits> wherein a predetermination has been made that Arabic numbers from 0 to 9 can be entered. Under this grammatical definition, a speech elements expression table can defined as shown in FIG. 9(b). Specifically, "0" can correspond to the four speech elements of "ree", "ree:", "rei", and "zero". Similarly, "1" can correspond to "ichi", a number "2" can correspond to three speech elements, "3" to one speech element, "4" to four speech elements, etc. FIG. 9(c) shows an example where the grammar of FIG. 9(a) has been applied to the speech elements expression of FIG. 9(b). The grammar and the speech elements expression of FIG. 9(c) can be used as practical base forms.

If received speech corresponding to <digits> is "zeroichinii:san", the speech can be analyzed into speech elements wherein "zero", "ichi", "nii:" and "sa_n" can be obtained. In that case, the numbers "0", "1", "2", and "3" corresponding to each speech element can be obtained from the speech elements correspondence table. Each number can be applied to the grammatical definition such that the four characters "0123" can be obtained as a recognition result for <digits>.

In speech recognition systems such as ViaVoice®, a method for improving recognition accuracy called enrollment can be adopted. Enrollment can detect individual differences of received speech and study acoustic characteristics that fit each individual. When the reading of numbers in the Japanese language is considered, however, speech recognition accuracy of such numbers is not always high.

Several possible factors can be identified, each of which can decrease speech recognition system accuracy. One factor can be that the Japanese words for numbers such as "ichi", "ni" and "san" are generally short and have less sound prolixity. There can be little difference among speech elements of a short word. Thus, misunderstanding of speech elements can easily occur during speech recognition. Other Japanese words for numbers can be comprised of one syllable such as "ni", "shi", "go" and "ku". The decreased sound prolixity for these words can be even more conspicuous.

Another factor can be that some Japanese words for numbers can be represented by a plurality of readings, speech elements, or pronunciations. For example, readings such as "zero", "rei" and "maru" can correspond to a number "0"; "shi" and "yon" to "4; "nana" and "shichi" to "7; and "kyuu:" and "ku" to "9". When a plurality of readings correspond to a single number, the number of speech element candidates to be recognized is increased. This can cause a higher probability of erroneous speech recognition.

Another factor can be that similar speech elements exist in different numbers. For example, the speech elements of "shichi" (7), "ichi" (1) and "hachi" (8) are similar to one another, as are the speech elements "shi" (4) and "shichi" (7). Additionally, the speech elements of "ni" (2) and "shi" (4) are similar, as well as those of "san" (3) and "yon" (4). Discrimination between such similar speech elements can be difficult due to the similarity of sound. As a result, erroneous recognition can become more probable. The problem can become more conspicuous where speech recognition is performed over a telephone line and the like where the available channel bandwidth is limited. For example, discriminating speech having the vowel "i" which requires recognition of a low frequency component can become more difficult with a limited bandwidth.

Other factors can include the pronunciation of words having one syllable with a long vowel wherein the long vowel is not necessarily included or pronounced in every situation. In that case, discrimination of such syllables can be difficult. Pronunciations such as "ni", "nii:", "nii:nii:" and "go", "goo:", "goo:goo:" are examples. Particularly, the character "5" which is usually pronounced "goo:" can be pronounced as "shichigosan" in the case of "753" and also can be pronounced "sangoppa" in the case of "358". "Goo;" further can be pronounced as "go" or "go" with a very short vowel and a plosive, which further can complicate the problem.

Speech recognition of numbers via telephone and the like, is commonly used in various business applications. Examples can include entering member numbers, goods selection numbers, etc. Consequently, there can be significant benefits to the improvement of speech recognition of numbers, especially with regard to the development of business applications.

It should be appreciated that enrollment can improve speech recognition accuracy to a certain extent by matching acoustic characteristics to individuals. Further improvement of speech recognition accuracy, however, can be limited in the case where received speech elements are similar to each other and the speech elements do not have prolixity as described above.

SUMMARY OF THE INVENTION

One object of the present invention can be to improve speech recognition accuracy, especially with regard to improving recognition accuracy of characters, words and the like which can correspond to a plurality of readings.

Another object of the invention can be to improve speech recognition accuracy for a sound having less prolixity such as numbers in the Japanese language and characters wherein a similar sound can correspond to different characters or words.

Another object of the invention can be to improve speech recognition accuracy in the case where pronunciation of a one syllable character with a long vowel can be changed into syllables with a short vowels and repeated.

The present invention makes good use of the knowledge of the present inventors that the same person can maintain the same reading consistently in one conversation. In other words, a person who pronounced "7" "shichi" has a tendency to keep pronouncing "shichi" consistently during the conversation. Making good use of this tendency, the present invention removes a speech element array corresponding to a reading that the person did not use in the first response in the conversation, or lowers a recognition probability for the reading, which can be applied in recognizing subsequent responses.

Therefore, a speech recognition system of the present invention can have correspondence information in which correspondence between a recognized word and a speech element array for expressing pronunciation of the recognized word can be stored, and recognizes one or more recognized words from an entered speech input by comparing a speech element array generated from entered speech with the speech element array in the correspondence information. In the case where a recognized word corresponding to the speech element array is recognized in an already performed recognition process corresponds to a plurality of speech element arrays, a pronunciation prediction probability of at least one speech element array which is different from the recognized speech element array among the plurality of speech element arrays can be lowered.

A speech recognition method of the present invention in a conversation of the same person in a certain period of time, can include the steps of: receiving a first speech input and generating a speech element array from the first speech input; searching correspondence information in which the speaking prediction probability of the speech element correspondence between recognized words and speech element arrays expressing pronunciation of the recognized words can be stored; and generating one or more recognized words through comparison between the speech element array generated by the first speech input and the speech element arrays in the correspondence information. The method further can include lowering a pronunciation prediction probability of at least one speech element array which differs from the recognized speech element array among the plurality of speech element arrays. In the case where a recognized word which corresponds to a recognized speech element array is made to correspond to a plurality of speech element arrays and is stored, the method can include receiving a second speech input; generating a speech element array from the second speech input; and searching correspondence information in which the pronunciation prediction probability of the speech element array is lowered. Also, the method can include generating one or more recognized words through comparison between the speech element array generated by the second speech and the speech element arrays in the correspondence information. Thus, a probability of erroneous recognition from the second time on is lowered to improve the recognition accuracy.

Characters, phrases and words can be included in the recognized words, and grammar information by which the recognized words can be arrayed in a specified rule can be included in the correspondence information. In addition, the recognized words can be numbers, numerals or words expressing numbers in the Japanese or English language. The present invention can be particularly useful in recognizing numbers.

In the case where a recognized word corresponding to a recognized speech element array is made to correspond to a plurality of speech element arrays and is stored, a function that lowers the pronunciation prediction probability for at least one speech element array which can be different from the recognized speech element array among the plurality of speech element arrays and a function that removes a speech element array which is different from the recognized speech element array to zero the pronunciation prediction probability can be included. Moreover, with regard to different speech element arrays that express pronunciation for the same recognized word, the speech element arrays having a number that suits a previously measured pronunciation prediction probability and the recognized word corresponding thereto can be included in the correspondence information. This further can increase the recognition accuracy.

The certain period of time can be a period of time in one continued conversation or a period of time that includes a plurality of conversations in one day. The pronunciation tendency of a speaker is highly apt to be maintained for a short period of time such as a unit of one day, especially during the same conversation. On the contrary, after time has passed, the pronunciation tendency of the speaker can change. In such a case, according to the present invention, the information to be used for recognition can be returned to the initial state after the certain period of time has passed, without maintaining the pronunciation tendency of the same speaker for a long time. This operation is possible based on the effect that the present invention adopts a temporary studying technique for one conversation, for example.

Note that, in the case where the conversation in the certain period of time is not continuous, a method of specifying a speaker by analyzing a password, a member number, an originating side telephone number or speech, or a method of specifying a speaker by combining these can be used.

In the case where at least a part of one or more recognized words is referred to a speaker and it is judged whether an error exists in recognizing the one or more recognized words, if the error is recognized, the one or more recognized words can be replaced by one or more recognized words that are easily recognized erroneously. By adopting such means or a method, the recognition accuracy of a continuous pronunciation for a long number having a check digit, for example can be improved.

In addition, in the case where a number of the one or more recognized words which are recognized does not conform to the number of words that was previously registered in the recognition system, a recognized word that corresponds to a speech element having a syllable of a long vowel among the one or more recognized words which are recognized can be replaced by a repetition of a recognized word that corresponds to a short vowel speech element corresponding to the long vowel. Alternatively, a repetition of a recognized word that corresponds to a speech element having a syllable of a short vowel among the recognized one or more words can be replaced by a recognized word that corresponds to a syllable of a long vowel corresponding to the short vowel. By adopting such means or a method, the recognition accuracy can be improved for the case where a word expressed in a syllable with a long vowel is repeated in a form with short vowels, or a word expressed in a repetition of a short vowel is recognized erroneously as a word of a syllable with a long vowel.

Another aspect of the invention can include a speech recognition system including correspondence information. The correspondence information can be for storing a correspondence between recognized words and a plurality of speech element arrays for expressing pronunciation of the recognized words. The speech recognition system can recognize a recognizable word from a received user spoken utterance by comparing a speech element array generated from the user spoken utterance with the plurality of speech element arrays in the correspondence information. In a dialog of a single person occurring within a certain period of time, the generated speech element array can correspond to one of the plurality of speech element arrays. A pronunciation prediction probability corresponding to one of the plurality of speech element arrays can be lowered. The pronunciation prediction probability can be different from the generated speech element array.

The different speech element arrays expressing pronunciation for a single recognized word can include a number corresponding to a previously measured pronunciation prediction probability and a recognized word corresponding to the previously measured pronunciation prediction probability. Programming means for detecting erroneously recognized words by referring a speaker to at least a part of the recognized word and programming means for replacing one of the erroneously recognized words with a recognizable word which can be recognized as one of the erroneously recognized words also can be included.

The speech recognition system further can include programming means for replacing a recognized word which corresponds to a speech element comprising one syllable with a long vowel with a previously recognized word comprising one syllable with a short vowel corresponding to the long vowel, when a number of recognized words do not conform to a previously registered number in the speech recognition system. Programming means for replacing a recognized word corresponding to a speech element having one syllable with a short vowel with another previously recognized word corresponding to one syllable with a long vowel, wherein the long vowel can correspond to the short vowel also can be included.

Another aspect of the invention can include a speech recognition method for use within a dialog of a single person, wherein the dialog can occur in a certain period of time. The method can include receiving a first user spoken utterance and generating a first speech element array from the first user spoken utterance; searching correspondence information wherein the correspondence information can associate recognizable words with a plurality of speech element arrays expressing pronunciation of the recognizable words; generating a first recognized word by comparing the first speech element array and the plurality of speech element arrays in the correspondence information; and lowering a pronunciation prediction probability of one of the plurality of speech element arrays which differs from the first speech element array, wherein one of the plurality of speech element arrays can be made to correspond to the first speech element array.

The method further can include receiving a second user spoken utterance and generating a second speech element array from the second user spoken utterance; searching the correspondence information comprising the lowered pronunciation prediction probability; and generating a second recognized word by comparing the second speech element array and the plurality of speech element arrays in the correspondence information. The correspondence information can include one of the plurality of speech element arrays having a number corresponding to a measured pronunciation prediction probability corresponding to one of the recognizable words.

The method further can include determining one of the recognized words to be erroneous by referring a speaker to at least part of one of the recognized words, and replacing the erroneous word with a different recognizable word. The different recognizable word can be erroneously recognized as the erroneous word. The method can include replacing one of the recognized words corresponding to a speech element comprising one syllable with a long vowel with a previously recognized word comprising one syllable with a short vowel corresponding to said long vowel wherein a number of the generated words do not conform to a previously registered number in the speech recognition system. Finally, the method can include replacing the previously recognized word corresponding to a speech element comprising one syllable with a short vowel with another previously recognized word corresponding to one syllable with a long vowel, wherein the long vowel can correspond to the short vowel.

BRIEF DESCRIPTION OF THE DRAWINGS

For a more complete understanding of the present invention and the advantages thereof, reference is now made to the following description taken in conjunction with the accompanying drawings.

FIG. 2 is a table showing an example of a speech elements expression table which can be used with the system of FIG. 1.

FIG. 4 is a list showing exemplary reduced grammar data.

FIG. 5 is a list showing further exemplary reduced grammar data.

FIG. 8 is a list showing exemplary grammar data to which un-uniformed probability distribution has been applied.

DETAILED DESCRIPTION OF THE INVENTION

Figure 1:
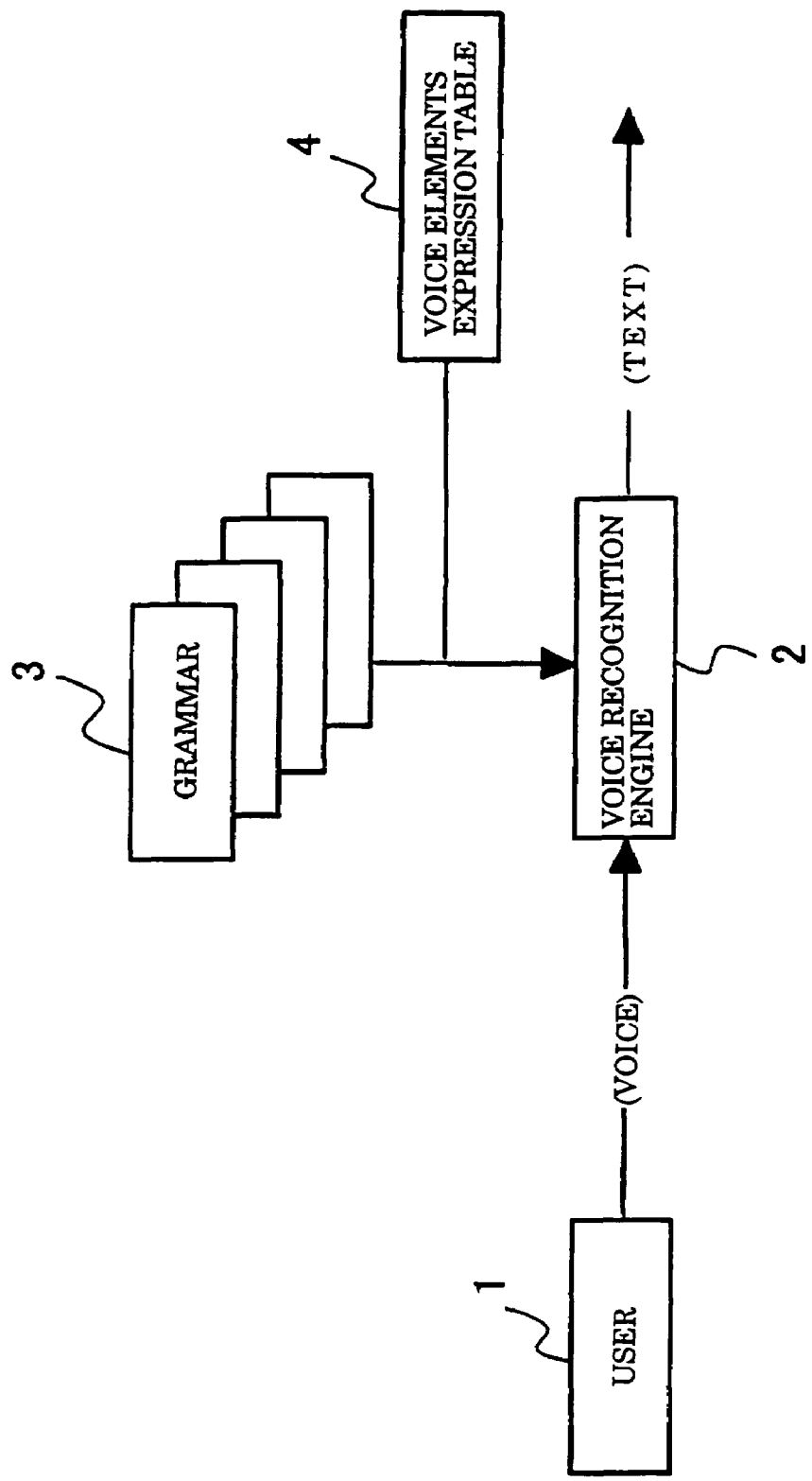
FIG. 1 is a block diagram showing an exemplary outline of a speech recognition system for use with the present invention.

Embodiments of the present invention will be described in detail with reference to the accompanying drawings below. Note that the present invention can be embodied in various other forms. Accordingly, the invention should not be limited to a strict interpretation of the description of the embodiments. It should be understood that the same numerals should refer to the same elements throughout the detailed description.

A method and a system for speech recognition will be mainly described in the following embodiments, but as it is clear to those skilled in the art, the present invention also can be embodied as a medium in which computer usable program codes are stored as well as the method and the system. Therefore, the present invention can be realized within embodiments such as hardware, software, and a combination of software and hardware. As a medium in which program codes are stored, an optional computer readable medium that includes a hard disc, a CD-ROM, an optical storage device or a magnetic storage device can be exemplified.

A computer system that can be used with the present invention can include a central processing unit (CPU), a main memory (RAM: Random Access Memory), a nonvolatile storage device (ROM: Read Only Memory) and the like, which are mutually connected by buses. In addition, coprocessors, an image accelerator, a cache memory, an input/output control device (I/O) and the like can be connected to the buses. An external storage device, a data input device, a display device, a communication control device and the like may be connected to the buses via a suitable interface. It should be appreciated that the computer system can include hardware resources typically equipped with a computer system besides the above-described components. A hard disc can be a typical external storage device, but the invention is not so limited to this, whereas semiconductor storage devices such as a magneto-optical storage device, an optical storage device, a flash memory, and the like can be included. Note that a read only storage device such as a CD-ROM, which can be used for reading a program, can be included in the external storage device in the case when it is used only for reading data or a program. The data input device can include an input device such as a keyboard and a pointing device such as a mouse. The data input device also includes a speech input device. A CRT, a liquid crystal display device, and a plasma display device are typical display devices. A computer system which can be used in conjunction with the inventive arrangements disclosed herein can include various kinds of computers such as a personal computer, a work station, and a mainframe computer. Computer programs for use with the present invention and which can be included with the computer system can be realized in a centralized fashion in one computer system, or in a distributed fashion where different elements are spread across several interconnected computer systems. In that case, the program can be referred to by an address such as a DNS, URL, or the like. Any kind of computer system or other apparatus adapted for carrying out the methods described herein is suited.

FIG. 1 is a block diagram showing an exemplary outline of a speech recognition system which can be used with the invention disclosed herein. The speech recognition system can include a voice or speech recognition engine 2 where speech or user spoken utterances of a user 1 can be received. Grammar data (grammar) 3 to be applied to the speech recognition engine 2 and a voice or speech elements expression table 4 to be applied to the grammar data 3 also can be included.

A speech signal of the user 1 can be converted to an electric signal by an input device, for example, a microphone or a headset. A/D (analog/digital) conversion can be performed. The signal can be converted to wave-form data that is expressed as digital data. The wave-form data can be analyzed or converted into speech elements and compared with the grammar data 3 by the speech recognition engine 2. Accordingly, speech recognition can be performed in this manner.

In the speech recognition engine 2, the grammar data 3 which suits the inputted speech elements most satisfactorily can be selected. The speech elements expression table 4 can be applied to the grammar data, and a large amount of grammar data 3 (in which speech elements based on the speech elements expression table 4 are arranged) can be prepared in the form of a grammar such that entered speech may follow or speech elements may be pronounced. The database of the grammar data 3 can be referred to, and the grammar data 3 that suits the inputted speech elements can be selected.

Figure 9:
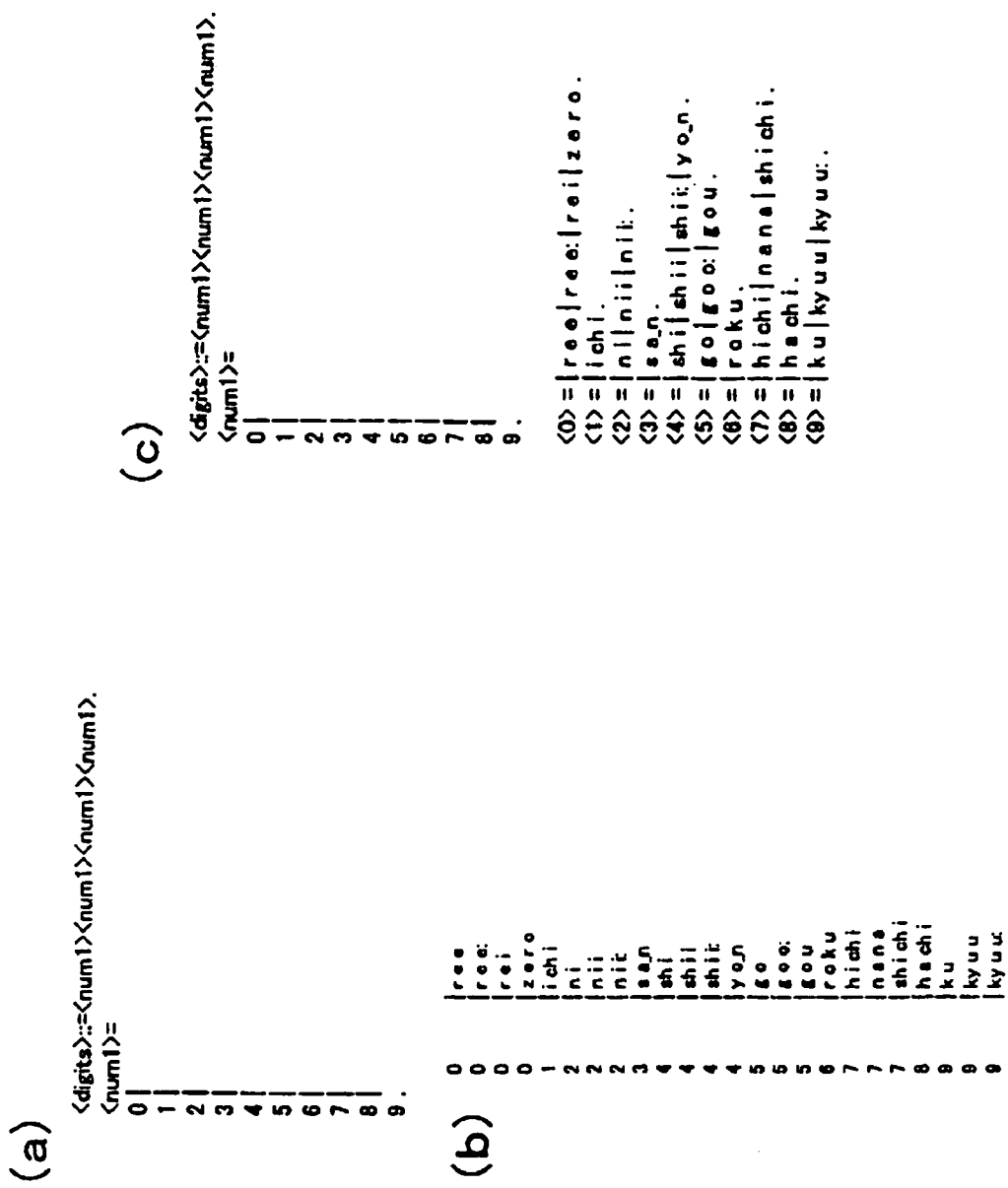
FIG. 9(a) is an exemplary list showing a grammar for recognizing a four digit string.
FIG. 9(b) is a table showing exemplary, practical speech elements expressions.
FIG. 9(c) is a list showing an example of grammar data to which the speech elements expression of FIG. 9(b) can be applied.

The grammar used in the embodiment can be equivalent to the one shown in FIG. 9(a). However, the speech elements expression table used in the embodiment can be different from the one of FIG. 9(b).

FIG. 2 is a table showing an example of the speech elements expression table used in the present invention. Conventionally, for example in the case of "0", a character "0" and four speech elements ("ree", "ree:", "rei", "zero") can be corresponded with each other. In one aspect of the invention, two kinds of readings for "0" can be considered, that is, "rei" and "zero". Reading information can be added to each speech element ("rei" and "zero" for "0"). Note that a reading of "maru" can be considered for "0", but for illustration purposes only two kinds of readings are exemplified here.

Other readings can include: "shi" and "yon" for "4"; "shichi" and "nana" for "7"; and "ku" and "kyuu" for "9". Notably, a plurality of readings for "0", "4", "7" and "9" can be considered as described above, but these readings are only examples and it is a matter of course that other readings can be added to the speech elements expression table wherein those other readings also can be considered. If a plurality of readings are considered for a number other than the above, such a plurality of readings naturally can be added. In addition, though numbers are exemplified in the embodiment, Chinese characters (kanji), alphabets and other characters can be applied. If a plurality of candidates are considered for a character, a speech elements expression table can be made wherein the plurality of readings can be included.

Figure 3:
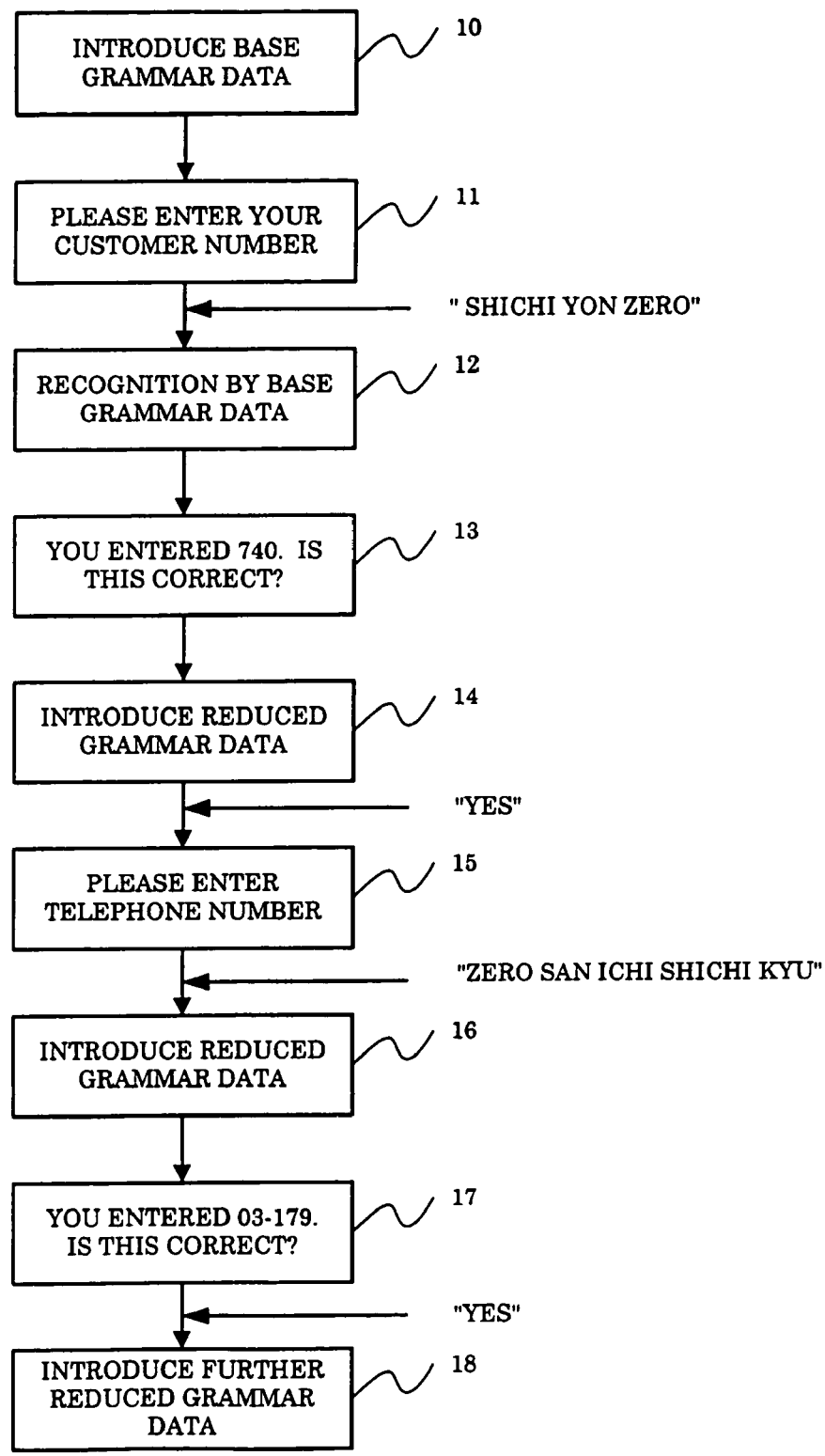
FIG. 3 is a flowchart of an exemplary speech recognition method illustrating an aspect of the invention.

An exemplary method of the speech recognition will be described with reference to the grammar and the speech elements expression below. FIG. 3 is a flowchart showing an example of the speech recognition method of the invention. In one embodiment of the invention, for example, dealing data can be received or inputted by speech via telephone.

First, base grammar data can be introduced, which becomes a base for the speech recognition system of the invention (step 10). The introduced base grammar data can be the same as that of FIG. 9(c) except that reading information can be added as shown in FIG. 2.

Next, a message "Please say your customer number" can be sent to a user from speech pronunciation means of the system side such as an audio playback system or text to speech technology (step 11). Assuming that the user's pronunciation is "shichiyonzero", recognition can be performed with the base grammar data in response to the speech entered (step 12). If the system recognizes "740", a message "Is 740 correct?" can be outputted from the system side (step 13). When the user says "Yes" in response thereto, a recognition result of "740" can be determined. If the recognition result is an error, the procedure can return to step 11 for entering or receiving the speech again.

After the decision determining "740" for the first speech recognition, for illustration it can be assumed that the user has read "7" in "shichi", "4" in "yon" and "0" in "zero". It is possible to assume that the user maintains the same reading at least in the same conversation or conversations in a short period of time (for example one day). The assumption is based on the knowledge of the present inventors that the same person is apt to maintain the same reading in the same conversation. Utilizing this tendency, there is a small possibility that the user can pronounce "7" as "nana". Similarly, it can be considered that there is a small possibility of pronouncing "4" as "shi" and "0" as "rei". Therefore, reduced grammar data is inserted in the next step (step 14).

Figure 4:
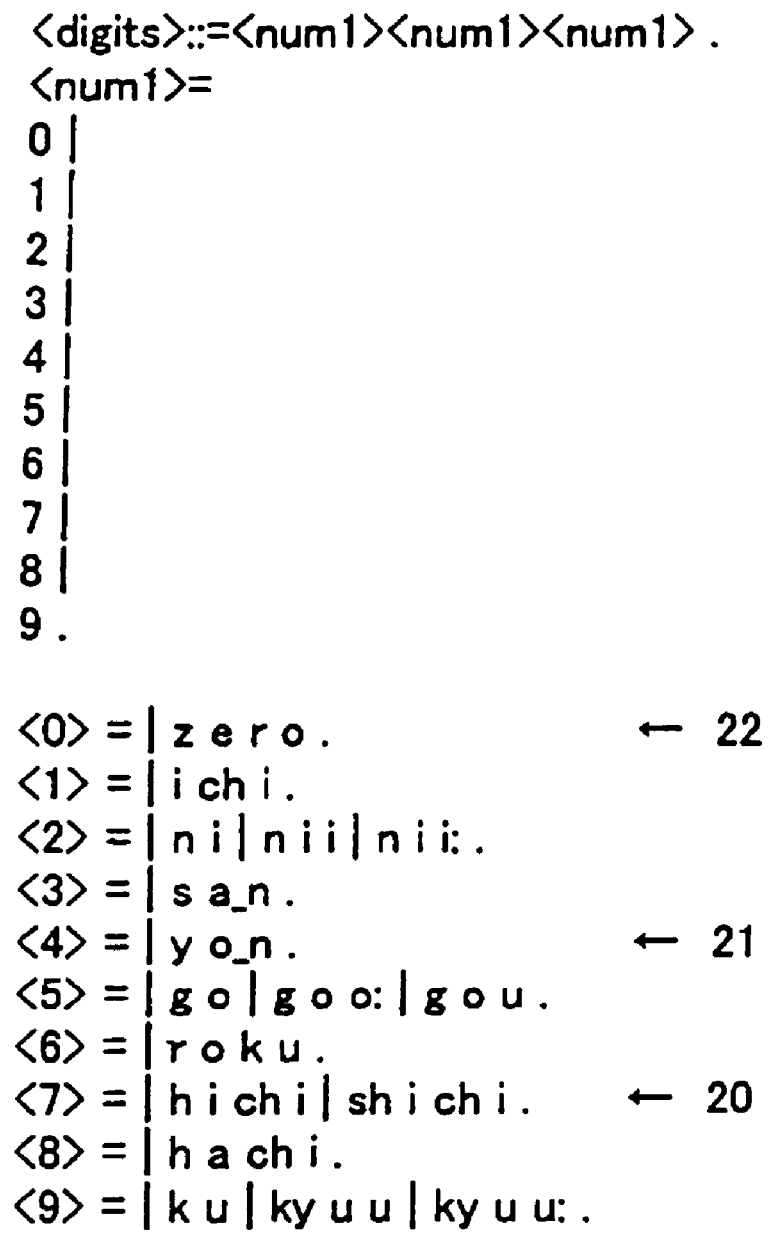

FIG. 4 is an exemplary list showing reduced grammar data. The grammar data can be equivalent to a grammar specified using Backus-Naur Forms (BNF) expressions. In other words, with regard to a character "7", a speech element "nana" corresponding to "nana" can be deleted. Accordingly, the speech elements can be limited to "hichi" and "shichi" corresponding to "shichr" (20). Similarly, regarding "4", speech elements "shi", "shi" and "shi:" corresponding to "shi" can be deleted, and thus, are limited to "yo_n" corresponding to "yon" (21). With regard to "0", speech elements "ree", "ree:" and "rei" corresponding to "rei" can be deleted and can be limited to "zero" corresponding to "zero" (22). As described above, the recognition probability can be further improved when speech elements of small pronunciation possibility are deleted and recognition is performed by using the grammar data to which the reduced speech elements are applied.

The reduced grammar data can be applied and the procedure can proceed to the next step. The system can output a message demanding a user to provide a second user spoken utterance (step 15). The speech recognition system can perform recognition in response to a received user spoken utterance (step 16). Assuming that the user spoken utterance is "zero san, no ichi shichi kyu:", recognition accuracy can be improved for received pronunciations of "ichi" and "shichi", where discrimination which was originally difficult in the case where the base grammar data is used, whereas "shichi" is now limited to "7". Moreover, since the user pronounces "9" "kyu:", the speech element "ku" can be deleted. Thus the grammar further can be reduced and applied (step 18).

Figure 5:
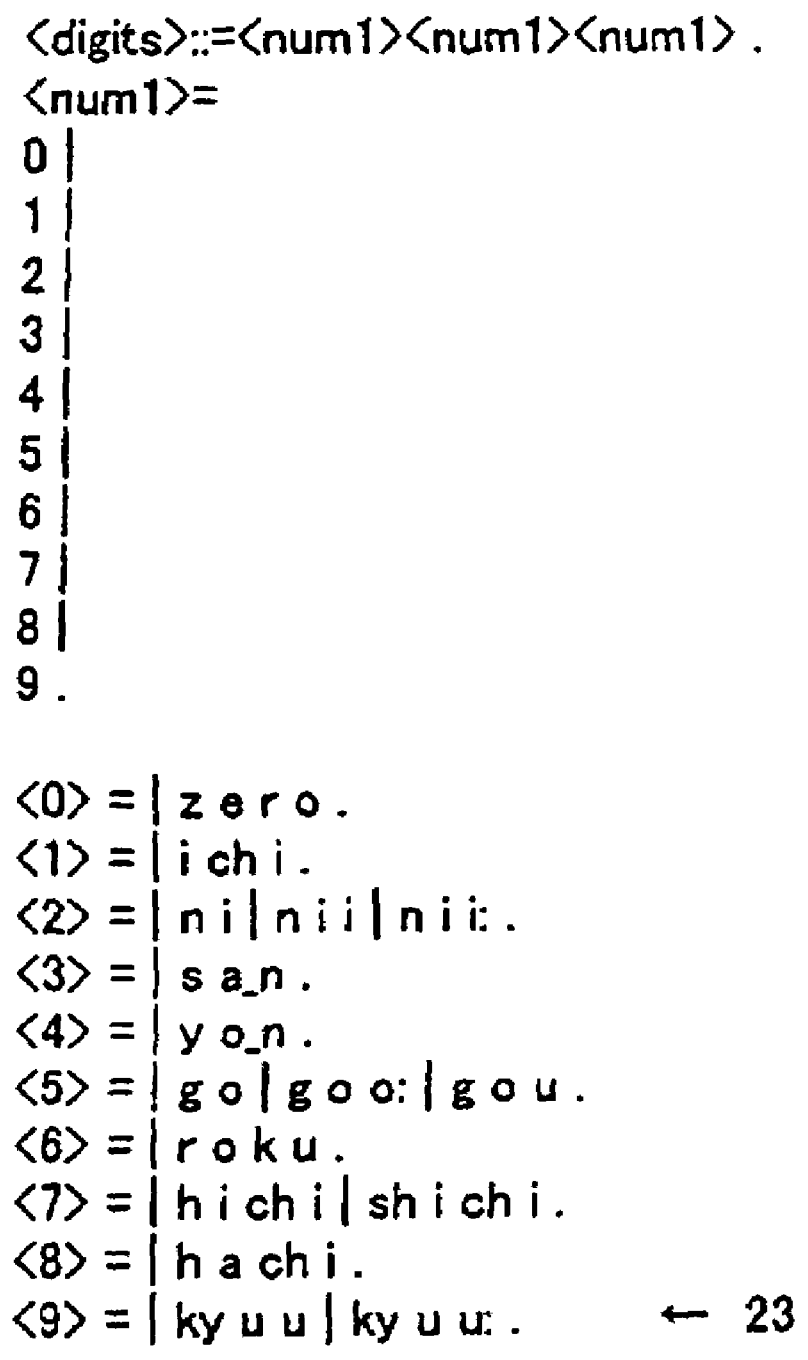

FIG. 5 is an exemplary list showing the further reduced grammar data. The speech element "ku" has been deleted with regard to "9" (23). A method can be adopted, in which the grammar data that corresponds to the speech elements expression table is previously made for the number of each reading combination, and unnecessary grammar data from the second recognition can be deleted. According to an aspect of the invention, by utilizing the tendency that the reading of numbers and the like is consistent and the same reading pronunciation is maintained by the same person, recognition of a second time can be performed after speech elements with low reading possibilities have been deleted. Accordingly, recognition probability for the second time can be improved. Note that the present invention is not intended for learning acoustic characteristics peculiar to a speaker, rather the invention is directed to a temporary learning. Speech recognition can start from the first step by using the base grammar data in the case of another speaker or a different day in spite of the same speaker. Therefore, there is no need for making a database for each speaker and the system of the same constitution can be applied to any speaker. As a result, the system need not be customized for each speaker. Thus, the present invention can be implemented and applied easily.

When a check digit is included in a specific figure of a number to be entered such as a credit card number, a presumed error word can be exchanged through error correction by using the check digit. The procedure can proceed to the next step through the recognition result after the correction.

Figure 6:
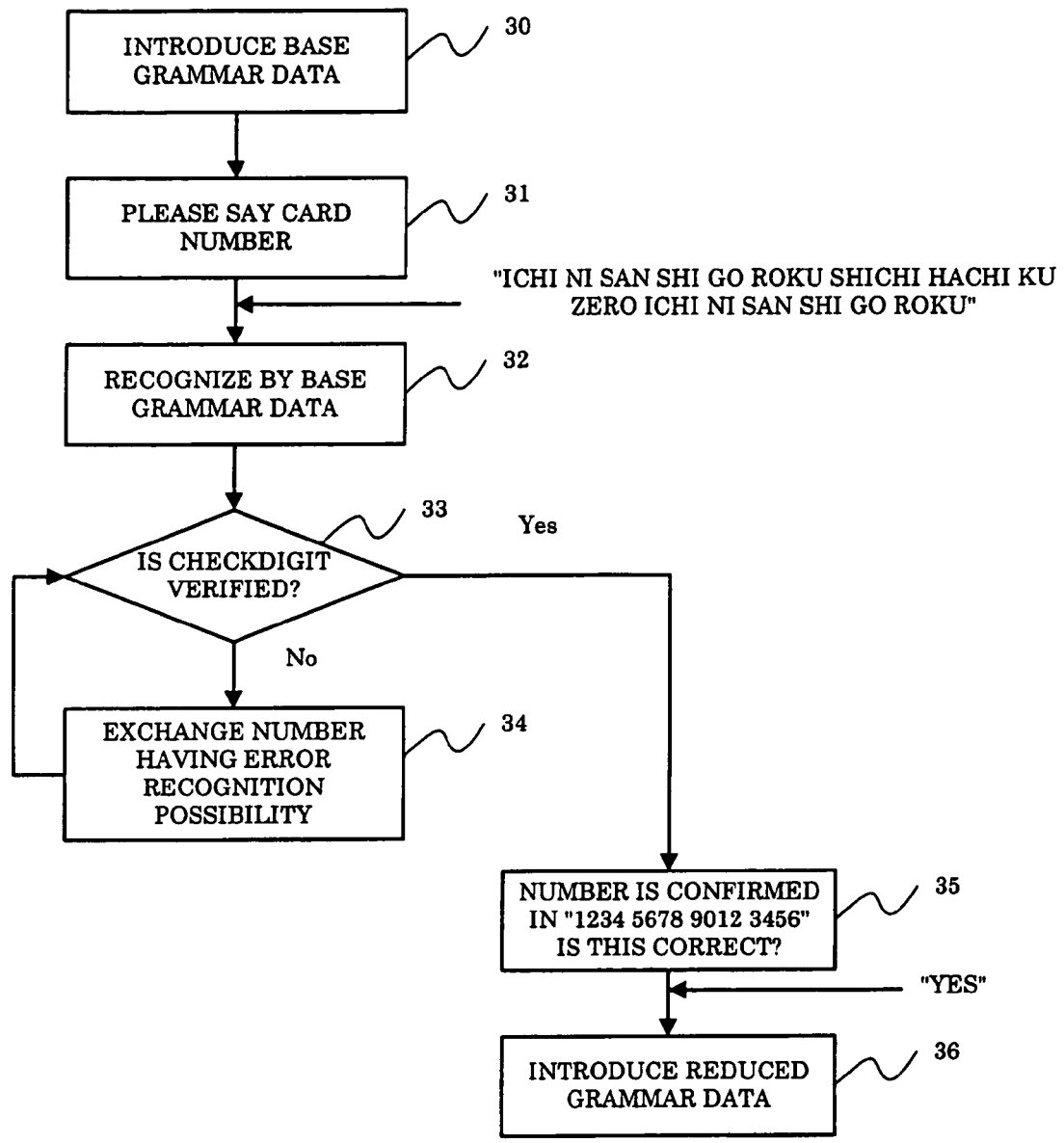
FIG. 6 is a flowchart showing another exemplary speech recognition method illustrating a further aspect of the invention.

FIG. 6 is a flowchart showing another exemplary speech recognition method of the present invention. The base grammar data can be introduced (step 30), a message demanding to enter a card number can be outputted (step 31), and speech recognition can be performed by applying the base grammar data (step 32). If the entered speech is pronounced "ich ni san shi go roku shichi hachi ku zero ichi ni san shi go roku", the probability of an erroneous recognition result wherein the entered speech is not recognized as "1234567890123456" is not notably low since this is the first recognition. In the case of a credit card, wherein the check digits are typically the last two figures "56", verification can be performed as to whether the check digits are correct (step 33). If such verification shows the result to be incorrect, a digit with a possibility of erroneous recognition can be exchanged (step 34) and verification can be performed again (step 33). When verification confirms a correct result, the procedure proceeds to the next step and confirmation is performed for the recognition result (number) after the error correction (step 35).

Numbers with a possibility of erroneous recognition can be: 1 "ichi", 7 "shichi" and 8 "hachi" (when "7" is pronounced "shich" or "7" is not recognized); 1 "ichi" and 8 "hachi" (when "7" is pronounced "nana"); 4 "shi" and 7 "shichi" (when "4" is pronounced "shi" and "7" "shichi"); or 6 "roku" and 9 "ku" (when "9" is pronounced "Ku"). The exchange of step 34 can be performed by mutually replacing these numbers.

Finally, based on the recognition result determined from the first recognition and the above-described error correction processing, unnecessary speech elements can be deleted, reduced grammar data can be made, and the reduced grammar data can be introduced for recognition during a second recognition (step 36).

According to a method of the invention, an error can be corrected by using the check digit function. Further, grammar data can be reduced each time a speech input is received from a user. Thus, the total processing time can be shortened.

Figure 7:
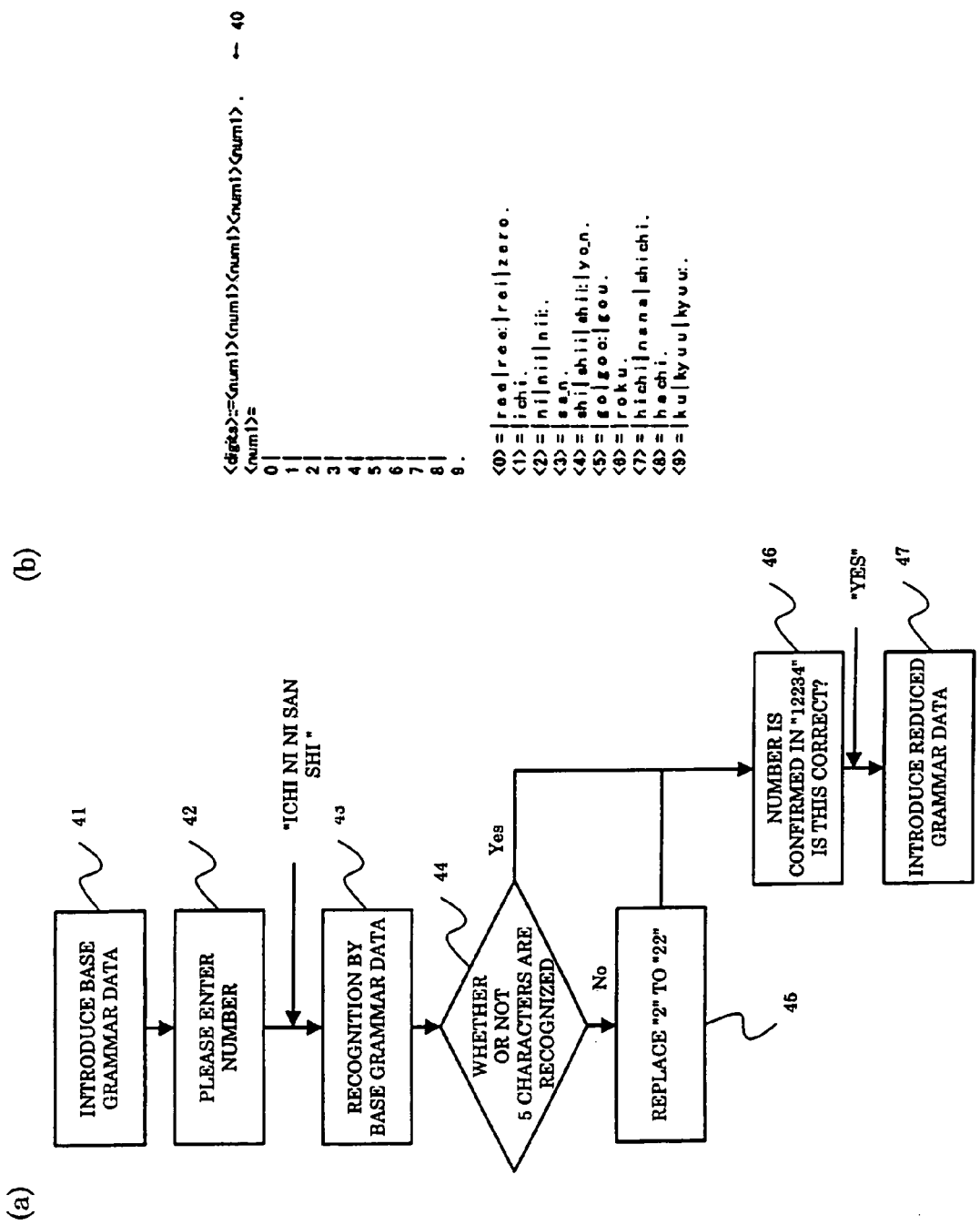
FIG. 7(a) is a flowchart showing an exemplary speech recognition method illustrating another aspect of the invention.
FIG. 7(b) is exemplary grammar data for use with the present invention.

When only four figures are recognized despite the fact that the grammar demands a five figure number, it is possible that a speech input of one syllable with a long vowel (for example 2 "nii:") became syllables with short vowels, and 2 "ni" was repeated. FIG. 7(a) is a flowchart showing another exemplary method of the invention. FIG. 7(b) depicts grammar data to be applied. As FIG. 7(b) indicates, a number of five digits is required as specified by the grammar (40).

As shown in FIG. 7(a), the base grammar data can be introduced (step 41), a message demanding to enter a card number can be outputted (step 42), and recognition can be performed by applying the base grammar data (step 43). If the entered speech is pronounced "ich ni ni san shi", an erroneous recognition result of "1234" can be determined. In step 44, it can be determined whether five figures were recognized (step 44). If only four characters are recognized, it can be presumed that "nini" was recognized erroneously as one character "2" with one syllable with a long vowel. Accordingly, "2" can be replaced with "22" (step 45), and the procedure can proceed to a confirmation step (step 46).

When the five characters are normally recognized, the procedure can proceed to step 46. Thereafter, based on the recognition result that is determined from the first recognition and the above-described error correction processing, unnecessary speech elements can be deleted. Accordingly, a reduced grammar data can be made which can be introduced for recognition for use during the second recognition (step 47).

According to an exemplary method of the invention, repetition of a short vowel that is easily recognized erroneously as a sound having one syllable with a long vowel can be corrected. As a result, the number of inputs required from a user to correct an error can be reduced thereby obtaining improved convenience and reduced total processing time. In one embodiment, an example is shown wherein repetition of a short vowel can be recognized erroneously as one character with a long vowel, but it should be appreciated that an error can be corrected in a similar manner wherein one character with a long vowel is recognized erroneously as repetition of a short vowel. Thus, the original number of characters can be erroneously recognized so as to have more characters than expected.

The present invention created by the present inventor has been specifically described based on the embodiments. However, the present invention is not limited to the embodiments, and various modifications can be made within the scope of the present invention. For example, as shown in FIG. 8, an un-uniformed probability distribution can be applied to grammar. Specifically, referring to "0", it can be found through experience that a probability of a pronounced "zero" is larger than a probability of pronounced "rei". In such a case, as shown in FIG. 8, three speech elements of "zero" can be allocated to <0> and one <rei> can be allocated thereto. In this case, a pronunciation probability can be assumed wherein 75% corresponds to "zero", and 25% to "rei". Note that speech elements of "ree", "ree:" and "rei" can be uniformly allocated to pronunciation of "rei". Recognition accuracy can be further improved by applying such un-uniformed probability distribution.

Moreover, the present invention also can be applied to the English language. For example, exemplary readings for "1-800-1122" can be: (1) "one eight hundred double one double two"; (2) "one eight oh oh eleven twenty two"; and (3) "one eight hundred one one two two". The same reading, however, can be considered to be maintained in one conversation or dialog. In the case of a plurality of readings for one expression, as in this example, recognition accuracy from the second time on can be improved by applying the present invention not only to Japanese but also to English. The same can be applied to English characters. For example, "0" has a plurality of readings such as "zero" and "oh". The present invention can be applied to such a case.

In addition, English has readings for a line of numbers such as: (1) reading figures by dividing numbers in two figures; (2) reading numbers continuously (solid reading); (3) official figure reading; and (4) expressing a continuation of the same number in double-xx, triple-xx and the like. For example, "1999" has readings such as "nineteen ninety nine", "one nine nine nine", "one thousand nine hundred ninety nine", "one triple nine" and "nineteen double nine". Such a plurality of readings requires grammar data that corresponds to the respective readings. Although in the first recognition, the grammar needs to include all the readings, for subsequent recognitions, the grammar data that is considered to be unnecessary can be deleted by applying the present invention. Thus, the recognition probability from the second time on can be improved in the case of English as well.

Further, the present invention is not limited to numbers and can be applied to regular words. For example, there are words of the same meaning, which can be expressed in a plurality of readings such as "ao/blu:(blue)", "sora tobu emban/yu:fo:/yu:efuo:(UFO)" and "iriguchi/hairikuchi (entrance)". The present invention can be used with regard to such words. Words which were not expressed in the first recognition can be deleted from the second recognition, thus the recognition probability from the second recognition on can be improved.

Still, the present invention can be applied to auxiliary verbs. For example, expressions such as ". . . da" or ". . . desu" are commonly used. In that case, an expression that was not used in the first recognition can be deleted, and the recognition probability from the second recognition on can be improved. Another aspect of the present invention can be for use with verbs, adjectives, and other parts of speech in the case where a plurality of readings or expressions thereof exist. In each case, speech recognition accuracy can be improved.

Advantages obtained by the representative items among the disclosed present invention can include improving speech recognition accuracy, particularly recognition accuracy for characters or words to which a plurality of readings are given. Moreover, recognition accuracy can be improved for sounds having little prolixity such as numbers in Japanese, characters and the like in the case where similar sounds correspond to different characters or words. Additionally, speech recognition accuracy can be improved in the case where a character of one syllable with a long vowel becomes a repetition of a character with a short vowel.

Although the preferred embodiments of the present invention have been described in detail, it should be understood that various changes, substitutions and alterations can be made therein without departing from spirit and scope of the invention as defined by the following claims.

What is claimed is:

1. A speech recognition system comprising:
correspondence information, said correspondence information storing a correspondence between recognized words and a plurality of speech element arrays, each array comprising associated rendering information for expressing pronunciation of said recognized words, said associated rendering information comprising at least one set of alternate renderings of a recognized word;
said speech recognition system recognizing a recognizable word from a received user spoken utterance by comparing a speech element array generated from said user spoken utterance with said plurality of speech element arrays in said correspondence information;
wherein, in a dialog of a single person occurring within a certain period of time, said generated speech element array corresponds to one of said plurality of speech element arrays, a pronunciation prediction probability corresponding to said one of said plurality of speech element arrays being reduced during said period of time by uniquely associating with said person one alternate rendering from the set of alternate renderings and excluding other alternate renderings from further consideration during said period of time.

2. The speech recognition system according to claim 1, wherein:

different speech element arrays expressing pronunciation for a single recognized word include a number corresponding to a previously measured pronunciation prediction probability and a recognized word corresponding to said previously measured pronunciation prediction probability.

3. The speech recognition system of claim 2, further comprising:
means for detecting erroneously recognized words by referring a speaker to at least a part of said recognized words; and
means for replacing one of said erroneously recognized words with a recognizable word which can be recognized as said one of said erroneously recognized words.

4. The speech recognition system of claim 3, further comprising:
means for replacing a recognized word which corresponds to a speech element comprising one syllable with a long vowel with a previously recognized word comprising one syllable with a short vowel corresponding to said long vowel, when a number of recognized words does not conform to a previously registered number in said speech recognition system.

5. The speech recognition system of claim 4, further comprising:
means for replacing a recognized word corresponding to a speech element having one syllable with a short vowel with another previously recognized word corresponding to one syllable with a long vowel, said long vowel corresponding to said short vowel.

6. The speech recognition system of claim 2, further comprising:
means for replacing a recognized word which corresponds to a speech element comprising one syllable with a long vowel with a previously recognized word comprising one syllable with a short vowel corresponding to said long vowel, when a number of recognized words does not conform to a previously registered number in said speech recognition system.

7. The speech recognition system of claim 6, further comprising:
means for replacing a recognized word corresponding to a speech element having one syllable with a short vowel with another previously recognized word corresponding to one syllable with a long vowel, said long vowel corresponding to said short vowel.

8. The speech recognition system of claim 1, wherein said certain period of time is a period of time for a continued dialog.

9. The speech recognition system of claim 1, wherein said certain period of time is a period of time including a plurality of dialogs in one day.

10. The speech recognition system of claim 1, further comprising:
means for detecting erroneously recognized words by referring a speaker to at least a part of said recognized words; and
means for replacing one of said erroneously recognized words with a recognizable word which can be recognized as said one of said erroneously recognized words.

11. The speech recognition system of claim 10, further comprising:
means for replacing a recognized word which corresponds to a speech element comprising one syllable with a long vowel with a previously recognized word comprising one syllable with a short vowel corresponding to said long vowel, when a number of recognized words does not conform to a previously registered number in said speech recognition system.

12. The speech recognition system of claim 11, further comprising:
means for replacing a recognized word corresponding to a speech element having one syllable with a short vowel with another previously recognized word corresponding to one syllable with a long vowel, said long vowel corresponding to said short vowel.

13. The speech recognition system of claim 1, further comprising:
means for replacing a recognized word which corresponds to a speech element comprising one syllable with a long vowel with a previously recognized word comprising one syllable with a short vowel corresponding to said long vowel, when a number of recognized words does not conform to a previously registered number in said speech recognition system.

14. The speech recognition system of claim 13, further comprising:
means for replacing a recognized word corresponding to a speech element having one syllable with a short vowel with another previously recognized word corresponding to one syllable with a long vowel, said long vowel corresponding to said short vowel.

15. A speech recognition method for use within a dialog of a single person, said dialog occurring in a certain period of time, said method comprising:
receiving a first user spoken utterance and generating a first speech element array from said first user spoken utterance;
searching correspondence information, said correspondence information associating recognizable words with a plurality of speech element arrays that each comprise associated rendering information for expressing pronunciation of said recognized words, said associated rendering information comprising at least one set of alternate renderings of a recognized word;
generating a first recognized word by comparing said first speech element array and said plurality of speech element arrays in said correspondence information;
lowering a pronunciation prediction probability of one of said plurality of speech element arrays which differs from said first speech element array by uniquely associating with said person one alternate rendering from the set of alternate renderings and excluding other alternate renderings from further consideration during said period of time, wherein said one of said plurality of speech element arrays is made to correspond to said first speech element array;
receiving a second user spoken utterance and generating a second speech element array from said second user spoken utterance;
searching said correspondence information, said other alternate renderings being excluded from consideration; and
generating a second recognized word by comparing said second speech element array and said plurality of speech element arrays in said correspondence information.

16. The speech recognition method of claim 15, wherein said correspondence information comprises one of said plurality of speech element arrays having a number corresponding to a measured pronunciation prediction probability corresponding to one of said recognizable words.

17. The speech recognition method of claim 16, further comprising:
  determining one of said recognized words to be erroneous by referring a speaker to at least part of said one of said recognized words; and
  replacing said erroneous word with a different recognizable word, said different recognizable word capable of being erroneously recognized as said erroneous word.

18. The speech recognition method of claim 17, further comprising:
  replacing one of said recognized words corresponding to a speech element comprising one syllable with a long vowel with a previously recognized word comprising one syllable with a short vowel corresponding to said long vowel wherein a number of said generated words does not conform to a previously registered number in said speech recognition system.

19. The speech recognition method of claim 18, further comprising:
  replacing a recognized word corresponding to a speech element comprising one syllable with a short vowel with another previously recognized word corresponding to one syllable with a long vowel, said long vowel corresponding to said short vowel.

20. The speech recognition method of claim 16, further comprising:
  replacing one of said recognized words corresponding to a speech element comprising one syllable with a long vowel with a previously recognized word comprising one syllable with a short vowel corresponding to said long vowel wherein a number of said generated words does not conform to a previously registered number in said speech recognition system.

21. The speech recognition method of claim 20, further comprising:
  replacing a recognized word corresponding to a speech element comprising one syllable with a short vowel with another previously recognized word corresponding to one syllable with a long vowel, said long vowel corresponding to said short vowel.

22. The speech recognition method of claim 15, wherein said certain period of time is a period of time for a continued dialog.

23. The speech recognition method of claim 15, wherein said certain period of time is a period of time including a plurality of dialogs in one day.

24. The speech recognition method of claim 15, further comprising:
  determining one of said recognized words to be erroneous by referring a speaker to at least part of said one of said recognized words; and
  replacing said erroneous word with a different recognizable word, said different recognizable word capable of being erroneously recognized as said erroneous word.

25. The speech recognition method of claim 24, further comprising:
  replacing one of said recognized words corresponding to a speech element comprising one syllable with a long vowel with a previously recognized word comprising one syllable with a short vowel corresponding to said long vowel wherein a number of said generated words does not conform to a previously registered number in said speech recognition system.

26. The speech recognition method of claim 25, further comprising:
  replacing a recognized word corresponding to a speech element comprising one syllable with a short vowel with another previously recognized word corresponding to one syllable with a long vowel, said long vowel corresponding to said short vowel.

27. The speech recognition method of claim 15, further comprising:
  replacing one of said recognized words corresponding to a speech element comprising one syllable with a long vowel with a previously recognized word comprising one syllable with a short vowel corresponding to said long vowel wherein a number of said generated words does not conform to a previously registered number in said speech recognition system.

28. The speech recognition method of claim 27, further comprising:
  replacing a recognized word corresponding to a speech element comprising one syllable with a short vowel with another previously recognized word corresponding to one syllable with a long vowel, said long vowel corresponding to said short vowel.

29. A machine readable storage, having stored thereon a computer program having a plurality of code sections executable by a machine for causing the machine to perform the steps of:
  receiving a first user spoken utterance and generating a first speech element array from said first user spoken utterance;
  searching correspondence information, said correspondence information comprising a correspondence between recognizable words and a plurality of speech element arrays that each comprise associated rendering information for expressing pronunciation of said recognized words, said associated rendering information comprising at least one set of alternate renderings of a recognized word;
  generating a recognized word by comparing said first speech element array and said plurality of speech element arrays in said correspondence information; and
  lowering a pronunciation prediction probability of one of said plurality of speech element arrays which differs from said first speech element array by uniquely associating with said person one alternate rendering from the set of alternate renderings and excluding other alternate renderings from further consideration during a period of time during which occurs a dialog of s single person, wherein said one of said plurality of speech element arrays is made to correspond to said first speech element array.

30. A machine readable storage, having stored thereon a computer program having a plurality of code sections executable by a machine for causing the machine to perform the steps of:
  receiving a first user spoken utterance and generating a first speech element array from said first user spoken utterance;
  searching correspondence information, said correspondence information associating recognizable words and a plurality of speech element arrays that each comprise associated rendering information for expressing pronunciation of said recognized words, said associated rendering information comprising at least one set of alternate renderings of a recognized word;
  generating a first recognized word by comparing said first speech element array and said plurality of speech element arrays in said correspondence information;
  lowering a pronunciation prediction probability of one of said plurality of speech element arrays which differs from said first speech element array by uniquely associating with said person one alternate rendering from the set of alternate renderings and excluding other alternate renderings from further consideration during a period of time during which occurs a dialog of s single person, wherein said one of said plurality of speech element arrays is made to correspond to said first speech element array;

receiving a second user spoken utterance and generating a second speech element array from said second user spoken utterance;

searching said correspondence information comprising said lowered pronunciation prediction probability; and generating a second recognized word by comparing said second speech element array and said plurality of speech element arrays in said correspondence information.

31. The machine readable storage of claim 30, wherein said correspondence information comprises one of said plurality of speech element arrays having a number corresponding to a measured pronunciation prediction probability corresponding to one of said recognizable words.

32. The machine readable storage of claim 30, wherein said certain period of time is a period of time for a continued dialog.

33. The machine readable storage of claim 30, wherein said certain period of time is a period of time including a plurality of dialogs in one day.

34. The machine readable storage of claim 30, further comprising:

determining one of said recognized words to be erroneous by referring a speaker to at least part of said one of said recognized words; and replacing said erroneous word with a different recognizable word, said different recognizable word capable of being erroneously recognized as said erroneous word.

35. The machine readable storage of claim 30, further comprising:

replacing one of said recognized words corresponding to a speech element comprising one syllable with a long vowel with a previously recognized word comprising one syllable with a short vowel corresponding to said long vowel wherein a number of said generated words does not conform to a previously registered number in said speech recognition system.

36. The machine readable storage of claim 35, further comprising:

replacing a recognized word corresponding to a speech element comprising one syllable with a short vowel with another previously recognized word corresponding to one syllable with a long vowel, said long vowel corresponding to said short vowel.

* * * * *